(12) United States Patent
Shalev et al.

(10) Patent No.: US 10,915,494 B1
(45) Date of Patent: Feb. 9, 2021

(54) APPROXIMATION OF MATHEMATICAL FUNCTIONS IN A VECTOR PROCESSOR

(71) Applicant: Habana Labs Ltd., Caesarea (IL)

(72) Inventors: Ron Shalev, Pardes Hana-Karkur (IL); Evgeny Spektor, Kfar Yona (IL); Sergei Gofman, Haifa (IL); Ran Halutz, Ramat HaSharon (IL); Shlomo Raikin, Moshav Ofer (IL); Hilla Ben Yaacov, Ra'anana (IL)

(73) Assignee: HABANA LABS LTD., Caesarea (IL)

( * ) Notice: Subject to any disclaimer, the term of this patent is extended or adjusted under 35 U.S.C. 154(b) by 93 days.

(21) Appl. No.: 16/186,546

(22) Filed: Nov. 11, 2018

Related U.S. Application Data (60) Provisional application No. 62/584,821, filed on Nov. 12, 2017.

(51) Int. Cl.
*G06F 17/17* (2006.01)
*G06F 15/80* (2006.01)
*G06F 9/30* (2018.01)

(52) U.S. Cl.
CPC ...... *G06F 15/8061* (2013.01); *G06F 9/30036* (2013.01); *G06F 17/17* (2013.01); *G06F 2101/10* (2013.01)

(58) Field of Classification Search
CPC ........... G06F 1/03; G06F 1/0314; G06F 17/17
See application file for complete search history.

(56) References Cited

U.S. PATENT DOCUMENTS

| | | | | |
|---|---|---|---|---|
| 5,068,816 A | * | 11/1991 | Noetzel | G06F 1/0356 708/270 |
| 2003/0037080 A1 | * | 2/2003 | Clifton | G06F 1/0356 708/270 |
| 2014/0222883 A1 | * | 8/2014 | Pineiro | G06F 1/02 708/523 |
| 2014/0324936 A1 | * | 10/2014 | Alexander | G06F 17/10 708/404 |
| 2017/0169132 A1 | * | 6/2017 | Hossack | G06F 16/9017 |
| 2019/0196790 A1 | * | 6/2019 | Anderson | G06F 9/30145 |

OTHER PUBLICATIONS

IEEE Standard 754™., "IEEE Standard for Floating-Point Arithmetic", pp. 1-70, Aug. 29, 2008.

* cited by examiner

*Primary Examiner* — Chuong D Ngo
(74) *Attorney, Agent, or Firm* — Kligler & Associates Patent Attorneys Ltd

(57) ABSTRACT

A vector processor includes a coefficient memory and a processor. The processor has an Instruction Set Architecture (ISA), which includes an instruction that approximates a mathematical function by a polynomial. The processor is configured to approximate the mathematical function over an argument, by reading one or more coefficients of the polynomial from the coefficient memory and evaluating the polynomial at the argument using the coefficients.

26 Claims, 8 Drawing Sheets

APPROXIMATION OF MATHEMATICAL FUNCTIONS IN A VECTOR PROCESSOR

CROSS-REFERENCE TO RELATED APPLICATIONS

This application claims the benefit of U.S. Provisional Patent Application 62/584,821, filed Nov. 12, 2017, whose disclosure is incorporated herein by reference.

FIELD OF THE INVENTION

The present invention relates generally to processor architectures, and particularly to techniques for efficiently approximating mathematical functions in a vector processor.

BACKGROUND OF THE INVENTION

Vector processing is a common operation for many applications such as deep learning. In some applications, it is necessary for vector processors to evaluate mathematical functions. In some cases, such evaluations are done by approximations.

Various algorithms to approximate mathematical functions are in use, including, for example, CORDIC, tailor-series approximation, look-up tables and polynomial evaluation.

SUMMARY OF THE INVENTION

An embodiment of the present invention that is described herein provides a vector processor, including a coefficient memory and a processor. The processor has an Instruction Set Architecture (ISA), which includes an instruction that approximates a mathematical function by a polynomial. The processor is configured to approximate the mathematical function over an argument, by reading one or more coefficients of the polynomial from the coefficient memory and evaluating the polynomial at the argument using the coefficients.

In an embodiment, the instruction approximates the mathematical function using multiple polynomials defined for multiple respective ranges of the argument, and the processor is configured to identify a range in which the argument falls, to read the coefficients defined for the identified range, and to evaluate the polynomial defined for the identified range using the read coefficients.

In another embodiment, the coefficient memory includes a global coefficient memory configured to store the coefficients of a plurality of polynomials that approximate a plurality of mathematical functions, and a local coefficient memory configured to store the coefficients of a subset of the polynomials, corresponding to a subset of the mathematical functions, and the processor is configured to read the coefficients for a given mathematical function from the local coefficient memory if the given mathematical function belongs to the subset, and, if the given mathematical function is not in the subset, to read the coefficients for the given mathematical function from the global coefficient memory.

In an embodiment, the vector processor additionally includes a coefficient descriptor memory, configured to store at least a first pointer pointing to the coefficients of the polynomials of the given mathematical function in the global coefficient memory and, if the given mathematical function belongs to the subset, a second pointer pointing to the coefficients of the polynomials of the given mathematical function in the local coefficients memory. The vector processor further includes a hash table, configured to store, for each mathematical function, a symbol indicating whether the mathematical function belongs to the subset, and an inverse hash table, configured to store, for each of the mathematical functions in the subset, an identifier of the mathematical function.

In another embodiment, the vector processor additionally includes tag registers configured to store identifiers of the mathematical functions that are approximated by the coefficients stored in the local memory, and the processor is configured to load the coefficients of the mathematical function from the local memory, at a starting address that corresponds to a tag register that stores an identifier corresponding to an identifier of the mathematical function, or from the global coefficient memory if none of the tag registers stores an identifier of the mathematical function.

In yet another embodiment, the ISA of the processor additionally includes an instruction that classifies arguments of the mathematical functions to normalized numbers and at least to one type of non-normalized numbers. In an embodiment, the ISA of the processor additionally includes an instruction that changes the output of the mathematical function based on the number type of an input of the mathematical function.

There is also provided, in accordance with an embodiment of the present invention, a method including, in a processor having an Instruction Set Architecture (ISA), which includes an instruction that approximates a mathematical function, storing one or more coefficients of the polynomial in a coefficient memory. The mathematical function is approximated over an argument, by reading the one or more coefficients of the polynomial from the coefficient memory and evaluating the polynomial at the argument using the coefficients.

The present invention will be more fully understood from the following detailed description of the embodiments thereof, taken together with the drawings in which:

DETAILED DESCRIPTION OF EMBODIMENTS

Overview

Vector processing is a common operation for many applications such as deep learning. For multi-dimensional arrays, a vector processor typically performs vector processing over one dimension, which is orthogonal to other dimensions in which the processing of the vectors elements is done.

According to embodiments of the present invention, vector processors (sometimes referred to as Array Processors) typically comprise an instruction memory, a data memory, a scalar processing engine and a vector processing engine (referred to hereinbelow as VPE). The scalar processing engine fetches Single Instruction Multiple Data (SIMD) instructions from instruction memory and sends the vector processing part of the instruction to the VPE. The VPE executes SIMD instructions on vector elements using hardware comprising an array of vector processing elements.

According to some embodiments of the present invention, the VPE is configured to approximate certain mathematical functions (will be referred to as approximated functions hereunder), in parallel for all (or some) of the vector processor elements. Such approximated functions may include, for example, log, square-root and arc-sin. In some embodiments, the VPE calculates the approximated functions using polynomial approximation; for example—second order polynomial:

$$F(x)=C_2*x^2+C_1*x+C_0$$

wherein C0, C1 and C2 are coefficients, which are defined for each approximated function (the argument of the function will be referred to as x hereinbelow).

In some embodiments, the approximated function is defined as the aggregation of a plurality of polynomials, each for a different range of x values (referred to hereinbelow as Interval). For a second order polynomial, for example, each interval i is characterized by $X_0(i)$, $C0(i)$, $C1(i)$, $C2(i)$. The approximated function is calculated, in each interval, as:

$$F(x)=C2(i)*(x-x_0(i))^2+C1(i)*(x-x_0(i))+C0(i)$$

The interval number (i) and the value of $X_0$ (interval start) are determined according to the value of x. (In the context of the present description, the terms Interval-Start and X0 are identical; we will use X0 in the equation hereinbelow, an Interval-start in the text).

In an embodiment, the VPE calculates the polynomial iteratively in a number of steps that is equal to the order of the polynomial. Initially the function gets the value of the highest order coefficient, and then, in each step, the VPE multiplies the current value of the function by $(X-X_0)$, and adds the next coefficient to the function. For example, in a second order polynomial:

First step:

$$f(x)=C2*(x-x_0)+C1$$

Second step:

$$f(x)=f(x)*(x-x_0)+C0=C2*(x-x_0)^2+C1*(x-x_0)+c0$$

In some embodiments of the present invention, the coefficients of the polynomials, in all intervals and for all the supported functions, are stored as look-up tables (LUT) in a Coefficient Table Global Memory. In embodiments, the coefficient memory may be duplicated, in full or in parts, in each processing element of the vector processor, in a local coefficients memory. In other embodiments, groups of processing elements may share the same local coefficients memory and access the memory serially. In yet other embodiments, groups of processing elements share a multiport local coefficient memory and access the memory concurrently. (Other combinations are used in alternative embodiments, as will be described below.)

According to some embodiments of the present invention, a local coefficient memory may hold a LUT for a single approximated function. In this case the VPE loads the local coefficient memory whenever a new approximated function must be evaluated. Loading of all local coefficient memories (one for each processing element) may be done in parallel.

In yet other embodiments, the local coefficient memory may hold the coefficients of a set of approximated functions which are likely to be used, and the set may change dynamically according to temporal requirement of the VPE software.

In some embodiments, a Coefficient Table Descriptor Memory is used by the VPE, wherein the Coefficient Table Descriptor Memory comprises one entry for each approximated function; and wherein each entry comprises a pointer to the start address of the coefficient of the function in the Coefficient Table Global Memory, and a pointer to the start address of the coefficient of the function in the Coefficient Table Local Memory. In an embodiment, entries of the Coefficient Table Descriptor Memory also comprise the size of the coefficient storage in the Coefficient Table Global Memory.

In some embodiments, when the Coefficient Table Local Memory stores the coefficients for more than one function, the VPE comprises a Hash Table, having one entry for every approximated function that the VPE supports. Each entry may be a single bit, indicating that the coefficients for the approximated function are currently stored in the local coefficient memory.

In an embodiment, when the Coefficient Table Local Memory stores the coefficients of more than one function, each entry of the Hash Table may comprise more than one bit, and indicate if the coefficients for the approximated function are currently stored in the Coefficient Table Local Memory, and, in addition, the start address of the coefficients in the Coefficient Table Local Memory. In some embodiments, when the Coefficient Table Local Memory stores the LUT of more than one function, the VPE may comprise an Inverse Hash Table, which stores function numbers for the functions that are stored in the Coefficient Table Local Memory.

In an alternative embodiment, hash tables are not used. Instead, the VPE comprises four tags that specify the function numbers pertaining to the coefficients that are stored in each quarter of the Coefficient Table Local Memory, and four comparators, which compare the number of the approximated function that the VPE calculates, in parallel, to the four function numbers in the four tags. A match detected by any of the comparators indicates that the function is stored in the Coefficient Table Local Memory, wherein the start address of the coefficient is determined by the first comparator which detects a match (e.g., a match found by the second comparator indicates that the function is stored in the second quarter of the Coefficient Table Local Memory). If none of the comparators detects a match, the function is not stored in the Coefficient Table Local Memory, and the Vector Processor must load the coefficients from the Coefficient Table Global Memory.

In some embodiments, the processor comprises special Instruction Set Architecture (ISA) instructions that support the evaluation of approximated functions. Such instructions may comprise, for example, instructions that get the interval numbers, and instructions to load the coefficients. In an embodiment, the VPE may execute some or all the special ISA instructions concurrently with other instructions, including instructions which calculate the value of the polynomial. In yet other embodiments, the VPE may execute instructions that support illegal number values, such as NaN and Infinity, as defined, for example, in IEEE 754 Floating Point standard.

System Description

Figure 1:
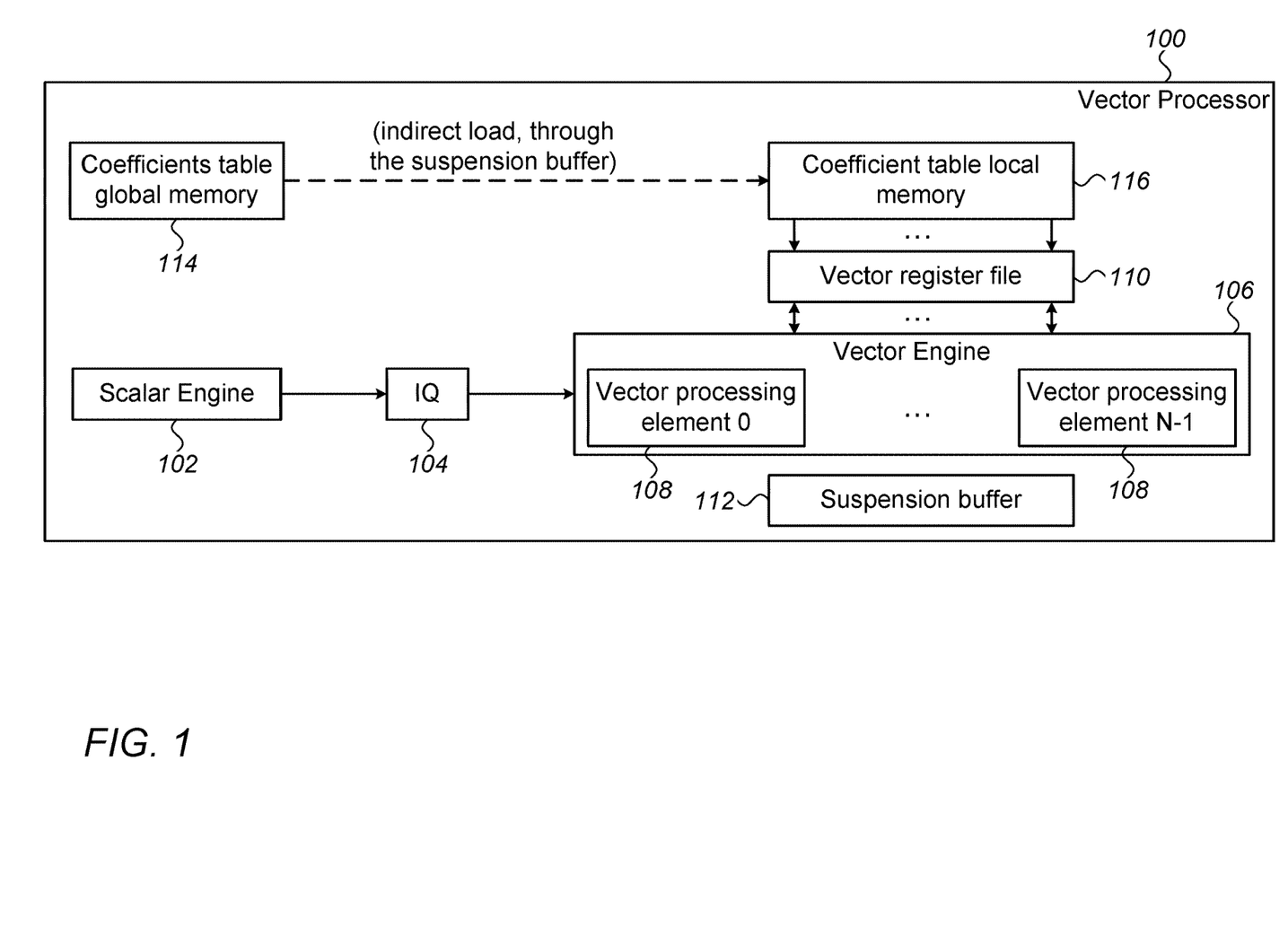
FIG. 1 is a block diagram that schematically illustrates the architecture of a vector processor, in accordance with embodiments of the present invention.

FIG. 1 is a block diagram that schematically describes the architecture of a vector processor 100, in accordance with embodiments of the present invention. The vector processor comprises a Scalar Engine 102, which sends instructions to an Instruction Queue 104; a Vector Processing Engine (VPE) 106, which comprises a plurality of Vector Processing Elements 108 (the number of processing elements 108 will be referred to hereinunder as N); and a Vector register File 110, which comprises registers that are coupled to Vector Processing Elements 106. The vector processor reads data from and writes data into a Suspension Buffer 112, which buffers data between an external memory (not shown) and the vector processor.

In some embodiments of the present invention, vector processor 100 is configured to calculate approximated functions by polynomial approximation, and further comprises a Coefficient Table Global Memory 114, and a Coefficient Table Local Memory 116. In an embodiment, the Coefficients table Global memory may reside externally to VPE (i.e. in global memory).

Coefficients Table Global memory 114 stores the function approximation coefficient tables, which comprise the coefficients for all intervals of all the approximated functions that the processor supports. Coefficients Table Local Memory 116 is a local store for the coefficients of a subset of the approximated functions (in some embodiments the subset comprises coefficients of a single approximated function; in other embodiments the subset comprises coefficients of more than one function, and in yet other embodiments the number of functions is configurable).

The vector processor is configured to load the coefficients from Coefficients Table Global Memory 114 to Coefficient Table Local Memory 116 (in practice, Coefficient Table Global Memory 114 is in the External Memory; when a load instruction is parsed, a read command is issued to load the coefficients to Coefficient Table Local Memory 116 from Coefficient Table Global Memory 114, through Suspension Buffer 112. This is done before the vector processor needs the coefficients). VPE 106 is configured to calculate the approximated functions F(x), using the coefficients that are stored in Coefficient Table Local Memory 116, wherein a different set of coefficients is used for every interval, and wherein the interval is selected according to the value of x. Thus, vector processor 100 can calculate mathematical functions using polynomial approximation in a plurality of intervals.

As would be appreciated, the configuration of vector processor 100 is an example configuration that is depicted purely for the sake of conceptual clarity. Other suitable configurations may be used in alternative embodiments of the present invention. For example, scalar engine 102 may be replaced by an instruction fetch unit; there may be only one coefficient memory, coupled to the vector processor; Instruction Queue 104 may be replaced by a RAM; and, more than one vector-engine 106 may be supported.

In some embodiments, scalar engine 102 comprises a general-purpose processor, which is programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

Figure 2:
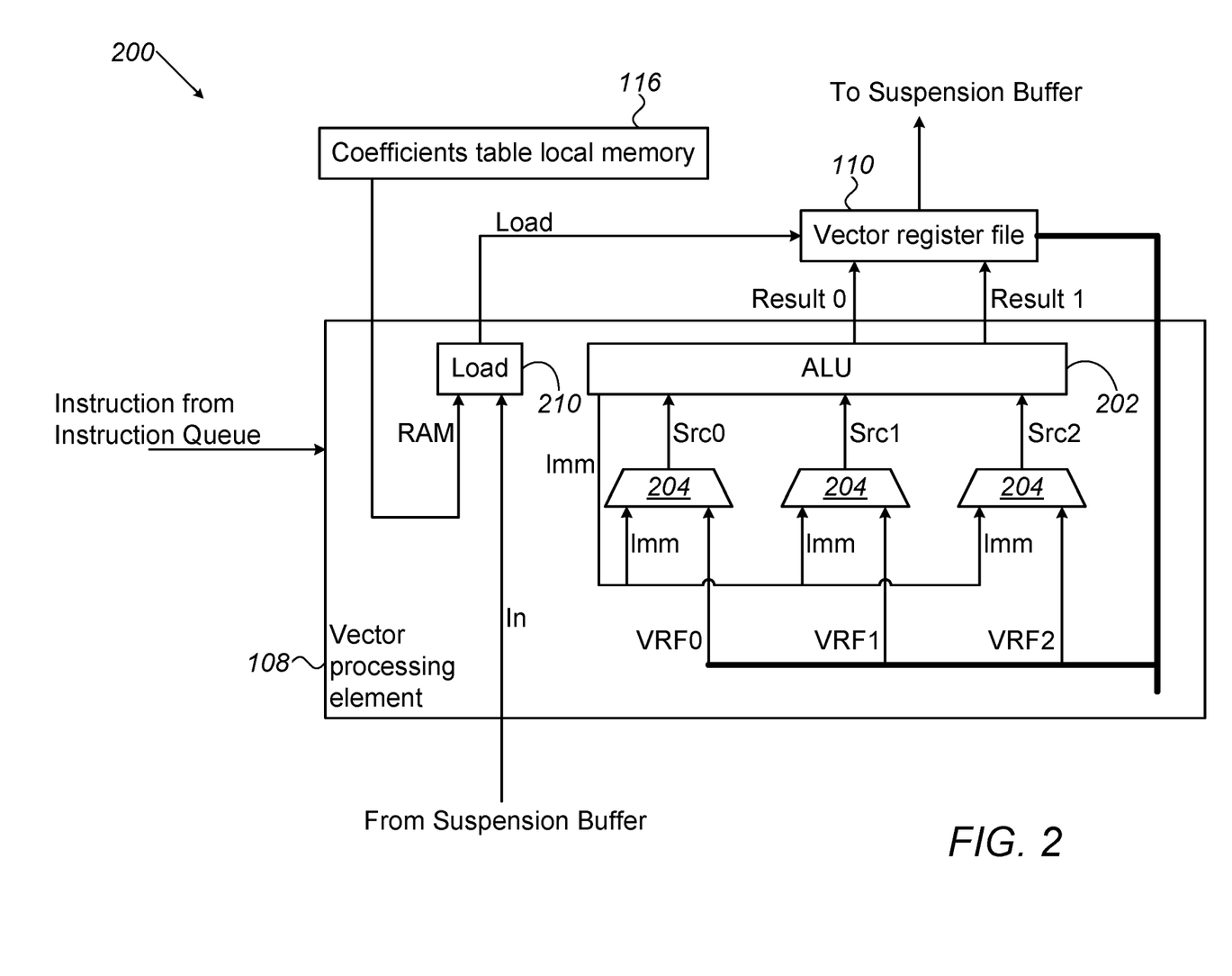
FIG. 2 is a block diagram that schematically illustrates a vector processing slice, in accordance with an embodiment of the present invention.

FIG. 2 is a block diagram that schematically describes a vector processing slice 200, in accordance with an embodiment of the present invention. The vector processor slice comprises a vector processing element 108 (FIG. 1), a slice of Coefficient Table Local Memory 116, and a slice of vector register file 110 (the number of slices equals N).

Vector Processing Element 108 comprises an ALU 202, multiplexors 204, and a Load unit 210. The vector processing element receives instructions from Instruction Queue 104 (FIG. 1), receives data from Suspension Buffer 112, and writes output data to the Suspension Buffer. ALU 202 is configured to execute operations with three inputs and two outputs. Multiplexors 204 select the three inputs of ALU 202 separately, either from registers of vector register file 110 or from an immediate field in the instruction. Vector Register File 110 is configured to store the outputs of ALU 202 in registers, and to output data to the Suspension Buffer.

Load Unit 210 is configured to load coefficients into Vector Register File 110. If the coefficients for the current function are stored in Coefficient Table Local Memory 116, the Load unit will transfer the coefficients directly to the register file. If the coefficients are not stored in the local memory, the Load unit will load the coefficients from the Suspension Buffer to the Vector Register File and to the Coefficient Table Local Memory.

If the coefficient table is not available in Coefficients table local memory:

It is read from the Coefficients tables global memory.

The function number is used as index to the descriptor memory.

Table start address in Coefficients global memory and table size are extracted from the Coefficients table descriptor memory. If local memory is designed to hold coefficients for multiple functions, the table start address in Coefficients tables local memory is also extracted.

The execution pipe of the vector engine is paused until the table is copied from the Coefficients tables' global memory into the Coefficients table local memory. The number of cycles to pause the pipe depends on table size.

As would be appreciated, the configuration of vector processing slice 200 is an example configuration that is depicted purely for the sake of conceptual clarity. Other suitable configurations may be used in alternative embodiments of the present invention. For example, the ALU may have a different number of inputs and outputs, or it may be embedded in the register file.

ISA Extensions

Some embodiments of the present invention comprise an Instruction Set Architecture (ISA) that includes special polynomial approximation instructions (in the foregoing, arguments that a function receives will be referred to as x):

1. GET_INTERVAL_NUMBER_AND_INTERVAL_START (GINIS):

{Dst+1,Dst}=GINIS(Src,MantissaShift,FunctionType). This instruction receives a function type and mantissa shift as parameters and argument x as input (using Src as the address of the argument in the vector register file) and returns the interval number and interval start as outputs (using Dst and Dst+1 as addresses in the vector register file). The GINIS instruction is executed as SIMD—same instruction for all vector elements. Each element uses the same parameters and its own argument x (input from the vector register file), and returns the corresponding interval number and interval start, as outputs to the vector register file. Each processing element calculates the interval number and the interval start based on the sign, mantissa and exponent of the vector element x.

In some embodiments the m most significant bits of the mantissa are used as interval number, and the rest of the mantissa bits are used as interval start, wherein m is the base-2 log of the number of intervals. For example, for functions with 256 intervals, and with x=0x377:

INTERVAL_NUMBER=0x377>>4=0x37

INTERVAL_START 0x377&((1<<4)−1))=0x7

In alternative embodiment, different mapping from x to the interval number and interval start may be used. In some embodiments, x is a floating-point number, having a mantissa and an exponent; the interval number and the interval start are determined according to the exponent and the mantissa of x as described hereinbelow.

The term SignificantLSBs specifies number of LS bit that are removed from the mantissa to set the initial interval value inside the LUT:

i) m=EXPONENT_OFFSET−SignificantLSBs
   ii) interval=mantissa >>SignificantLSBs
   iii) interval start=abs(x) & ~((1<<SignificantLSBs)−1).

In the functions described below, the LUT comprises multiple sub-tables. A sub-table is selected using a "subtableOffset" (will be defined below); whereas Interval is used to select an entry in the selected sub-table. The number of bits of the interval is log 2 of the number of intervals in the sub-table (the number of intervals in the sub-tables is a power of 2).

Pseudo-Code for Tanh (Hyperbolic Tangent)
If non bias exponent >2, set non bias exponent=0
if (non bias exponent <0)
{
  subtableOffset=0;
  numBitsForInterval=non bias exponent+m;
  if (numBitsForInterval <0)
  {
  interval=0;
  interval start=0;
  }
  else
  {// numBitsForInterval >=0
  numBitsFromMantissa=numBitsForInterval
  mantissaShift=(EXPONENT_OFFSET−numBitsFrom-Mantissa);
  interval=(1<<numBitsForInterval)|
     (mantissa>>mantissaShift);
  interval_start=abs(x) & ~((1<<mantissaShift)−1);
  }
} else
{
subtableOffset=(non bias exponent+1)<<m;
}
Pseudo-Code for Sqrt/Rsqrt (Square Root/Reciprocal Square Root)
subtableOffset=(non bias exponent & 1)<<m;
Pseudo-Code for Sin/Cos
subtableOffset=0;
numBitsForInterval=non bias exponent+m;
if (numBitsForInterval <0)
{
interval=0;
interval_start=0;
}
else
{// numBitsForInterval >=0
numBitsToTakeFromMantissa=numBitsForInterval;
mantissaShift=(EXPONENT_OFFSET−numBitsFromMan-tissa);
interval=(1<<numBitsForInterval)|
(significand>>mantissaShift);
interval_start=tmp_ABS & ~((1<<mantissaShift)−1);
}
Pseudo-Code for Log
if ((non bias exponent >0)||(non bias exponent <−1)||((non bias exponent==−1) && (Mantissa <0x40)))
   subtableOffset=0<<m;
else if (non bias exponent==0)
   subtableOffset=1<<m;
else
   subtableOffset=2<<m;
Then LUT interval is calculated as:

LUT interval=(subtableOffset|interval);

2. COEFFICIENT_LOAD_C1C2 and COEFFICIENT_LOAD_C0:

{Dst}=COEFF_LOAD_C0 (FunctionNum, Src),
{Dst+1,Dst}=COEFF_LOAD_C1C2   (FunctionNum, Src).

This instruction is executed by Load Unit 210 (FIG. 2). The instruction receives the function number as a parameter and the interval as input (using Src as the address in the vector register file) and returns the approximation coefficients as outputs (using Dst and Dst+1 as addresses in the vector register file). This is a SIMD instruction, in the sense that all vector processing elements execute the same instruction, using the same function number, on different data (interval). Each vector processing element uses the same function number and its own interval as input from the vector register file and returns interval coefficients as outputs, to the vector register file. Each vector processing element will load a different set of coefficients according to its interval number, from Coefficient Table Local Memory 116 to Vector Register File 110.

Pipelined Execution

Figure 3:
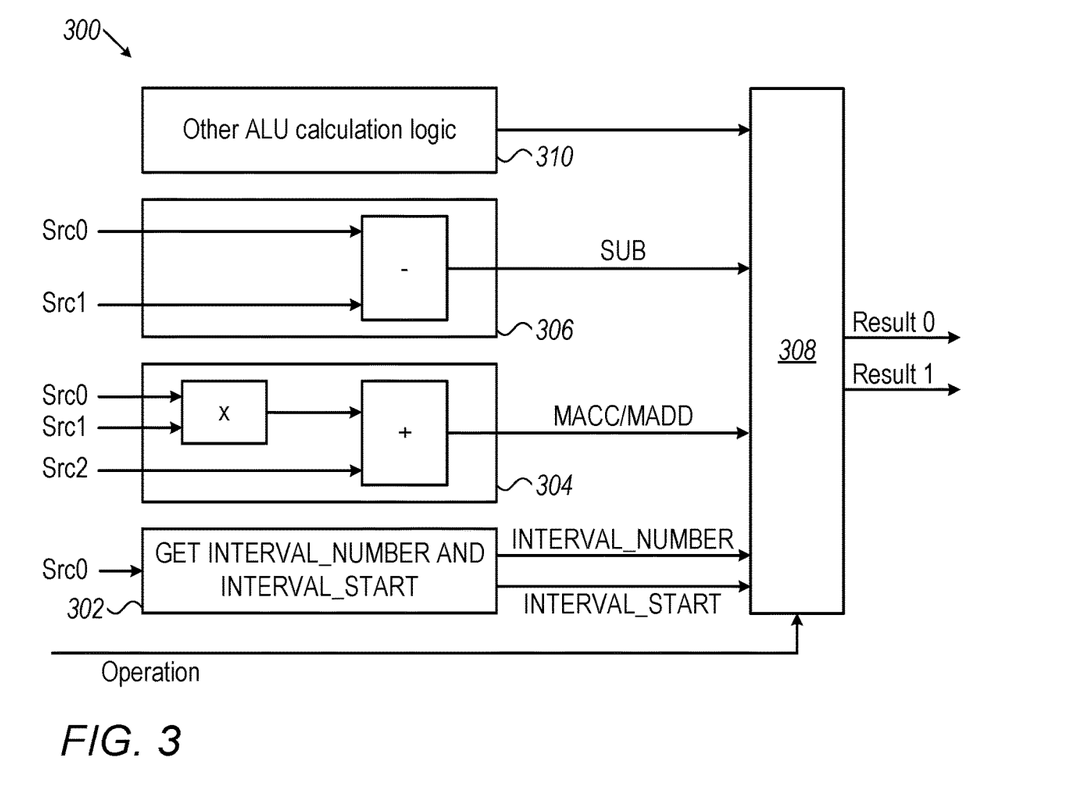
FIG. 3 is a block diagram that schematically illustrates the Arithmetic Logic Unit (ALU) of a vector processing element, in accordance with an embodiment of the present invention.

The vector processor element is configured to execute the ISA instructions describes above in a pipeline manner. FIG. 3 is a block diagram that schematically describes an Arithmetic Logic Unit (ALU) 300 (202 in FIG. 2) of a vector processing element, in accordance with an embodiment of the present invention. The ALU comprises a Get-Interval-Number-and-Start unit 302, a Multiply-Add unit 304, a Subtract unit 306, a double-multiplexor 308 and an Other ALU Calculation unit 310 (Other ALU Calculation Unit 310 handles instructions that are not relevant to the description herein).

Get-Interval-Number-and-Start unit 302 is configured to execute the GINIS instruction that was defined above, and to send the interval-number and interval-start, through multiplexor 308, to vector register file 110 (FIG. 1). Multiply-Add unit 304 is configured to calculate Src2+Src0*Src1, and output the result (MACC/MADD), through multiplexor 308, to vector register file 110. Subtract unit 306 is configured to calculate Src0-Src1 (or Src1-Src0), and output the result (SUB), through multiplexor 308, to vector register file 110. Lastly, Multiplexor 308 is configured to send two of its inputs (Result0 and Result1) to register file 110, wherein Result® and Result1 are selected from interval-number and interval-start outputs of Get-Interval-Number-and-Start 302, MACC/MADD output of Multiply-Add unit 304, SUB output of Subtract Unit 306, and the output of Other ALU Calculation Unit 310.

According to some embodiments, calculation of a second order polynomial is done in four cycles:

Cycle 0—Get-Interval-Number-and-Start unit 302 calculates the interval number and interval start.

Cycle 1—Load Unit 210 (FIG. 2) executes COEFFICIENT_LOAD_C1C2; At the same cycle, Subtract Unit 306 subtracts the interval start from x (the result of the subtraction is referred to herein as delta.)

Cycle 2—Load Unit 210 executes COEFFICIENT_LOAD_C0; At the same cycle Multiply-Add unit 304 calculates C2*delta+C1 (the result of the operation will be referred to herein as Result)

Cycle 3—Multiply-Add unit 304 calculates Result*delta+C0 (=c2*delta^2+c1*delta+C0). This is the final value of the polynomial.

In some embodiments cycle 3 may be executed concurrently with cycle 0 of the next instruction; so that, effectively, polynomial calculation takes three cycles.

Thus, the vector processing element depicted in FIG. 2 and FIG. 3 executes extended ISA instructions, in a pipelined manner, to evaluate second order polynomials in three or four cycles, concurrently for all vector-processor elements of vector processor 100.

As would be appreciated, the configuration of ALU 300, as well as the definitions of the GINIS, the COEFF_LOAD_C0 and the COEFF_LOAD_C1C2 instructions, are an example that is depicted purely for the sake of conceptual clarity. Other suitable configurations and ISA instruction may be used in alternative embodiments of the present invention. For example, ALU 300 may comprise more calculation units, and complete the calculation in fewer cycles; for another example, calculation may take more cycles, including cycles to check for illegal numbers (as will be described hereinbelow).

Figure 4:
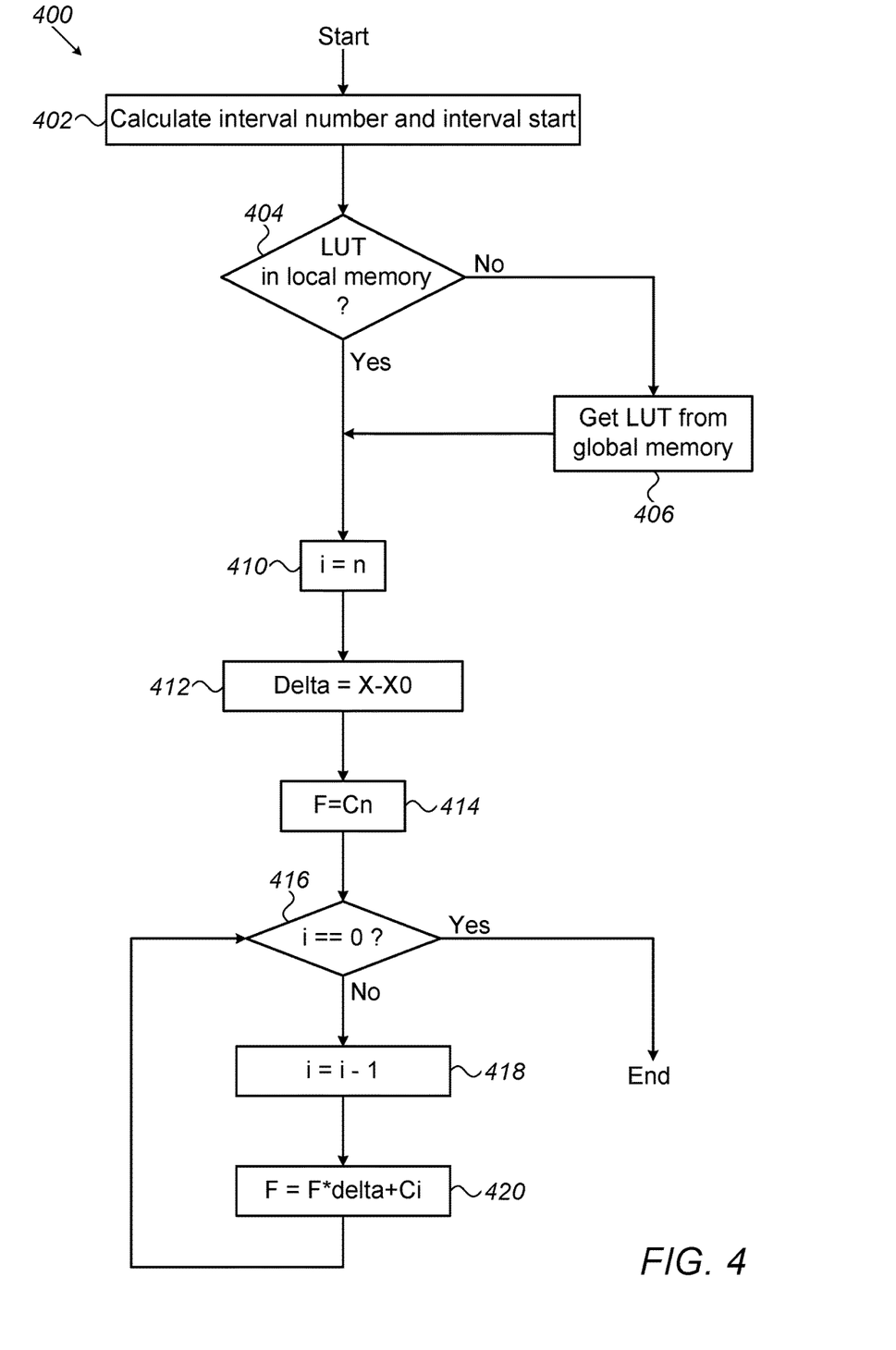
FIG. 4 is a flow chart that schematically illustrates the computation steps which the vector processor executes to calculate an n order polynomial, in accordance with an embodiment of the present invention.

In some embodiments of the present invention, the polynomial order may be larger (or smaller) than two. FIG. 4 is a flow chart 400 that schematically describes the computation steps which the vector processor executes to calculate an n order polynomial, in accordance with an embodiment of the present invention. The flow chart is executed by the vector processor.

The flow chart starts at a Calculating-Interval-Number-and-interval-start step 402, wherein the vector processor evaluates the interval number and interval start from the value of X (as was explained hereinabove). The interval number will be used to select the LUT entry, whereas interval start will be used in the calculation (as will be described herein).

Next, the processor enters a Checking-if-LUT-in-Local-Memory step 404, wherein the vector processor checks if the coefficients for the current function are stored in Coefficient Table Local Memory 116 (FIG. 2). If the coefficients are stored in the local memory, the vector processor will enter a Setting-i step; whereas if the coefficients are not stored in the local memory, the vector processor will first enter a Getting-LUT step 406, wherein the vector processor will get the coefficients from global memory, and then enter step 410.

Next, the vector In step 410, the vector processor loads i (for example, a register in vector register file 110) with the value of n–the order of the polynomial. The vector processor next enters a Calculating-Delta step 412, wherein the difference X–X0 is calculated and saved, for example, in another register of vector register file 110.

After step 412, the vector processor enters an Initializing-F step 414, wherein F (for example, yet another register in vector register file 110) gets the value of the highest-level coefficient of the polynomial–Cn (the coefficient which multiplies X to the power of n).

After step 414, the vector processor enters a Checking-Done step 416, wherein the vector processor checks if i equals 0. If i does not equal zero, the calculation is not done, and the vector processor will proceed to a Decrementing-i step 418. If, in step 416, i equals 0, the calculation is done and the flow chart ends.

After step 418, the vector processor enters an Updating-F step 420, wherein F is multiplied by delta, Ci is added to the product and the result is stored as F.

It should be noted that steps in flow chart that are illustrated and described as serial may be executed concurrently (i.e. at the same clock cycle). For example, the following groups of steps may be executed concurrently: steps 410, 412 and 414; steps 418 and 420.

As would be appreciated, flow chart 400 is an example that is depicted purely for the sake of conceptual clarity. Other suitable flow charts may be used in alternative embodiments. For example, steps 416 and 420 may be interchanged if, at step 410, i gets an initial value of n+1.

Memory Configurations

Figure 5:
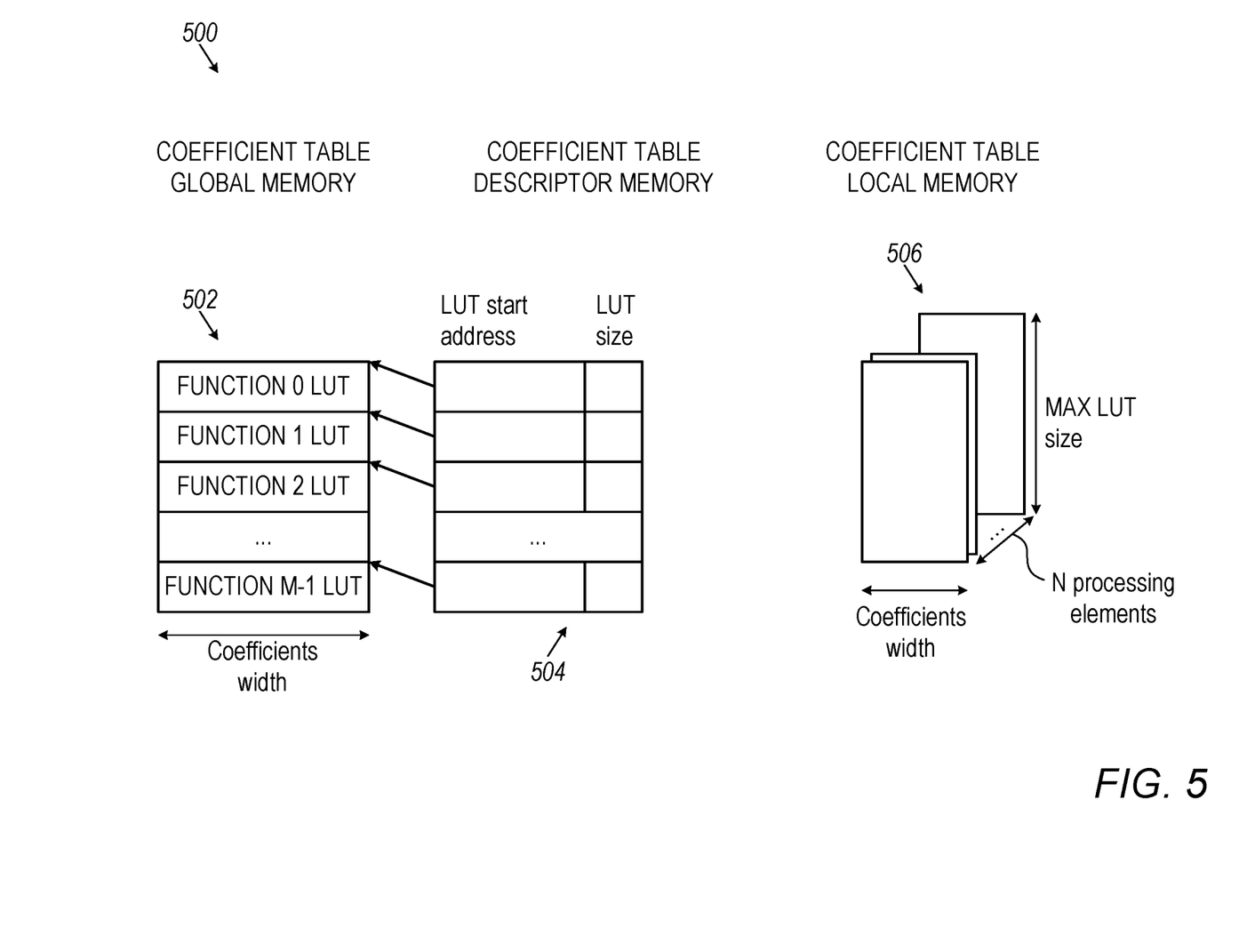
FIG. 5 is a block diagram that schematically illustrates the configuration of memories that store the polynomial coefficients, in accordance with an embodiment of the present invention.

FIG. 5 is a block diagram 500 that schematically describes the configuration of memories that store the polynomial coefficients, in accordance with some embodiments of the present invention. The memories comprise a Coefficient Table Global Memory 502, which comprises M LUTs for the M approximated functions that the vector processor supports; a Coefficient Table Descriptor Memory 504, which comprises M entries, wherein each entry comprises a pointer to the start address of coefficients LUT in Coefficient Table Global Memory 502, and a number indicating the LUT size; and, a Coefficient Table Local Memory 506, which comprises N copies (wherein N is the number of processing elements of VPE 106). According to the example embodiment of FIG. 5, Coefficient Table Local Memory 506 stores the LUT of one approximated function at a time.

Figure 6:
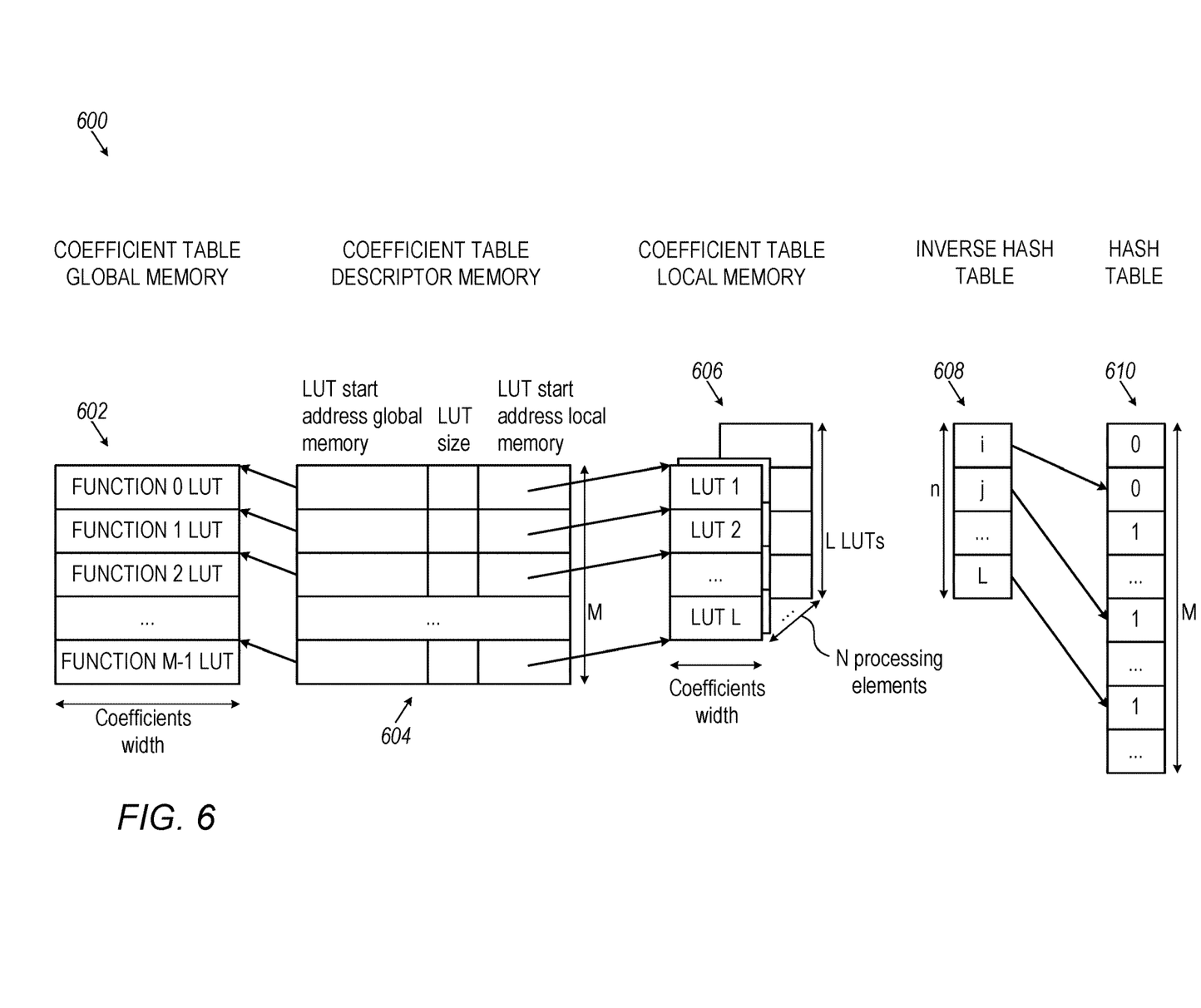
FIG. 6 is a block diagram that schematically illustrates the configuration of memories that store the polynomial coefficients, in accordance with another embodiment of the present invention.

FIG. 6 is a block diagram 600 that schematically describes the configuration of memories that store the polynomial coefficients, in accordance with other embodiments of the present invention. In the example configuration of FIG. 6, the local coefficient memory may comprise LUTs for more than one approximated function.

The configuration comprises five memories: a Coefficient Table Global Memory 602, a Coefficient Table Descriptor Memory 604, a Coefficient Table Local Memory 606, an Inverse Hash Table 608 and a Hash Table 610.

Coefficient Table Global Memory 602 comprises M LUTs for the M approximated functions that the vector processor supports. The width of the Coefficient Table Global Memory equals the width of the coefficients.

Coefficient Table Descriptor Memory 604 comprises M entries, wherein each entry comprises a pointer to the start address of the coefficients LUT in Coefficient Table Global Memory 602, a pointer to the start address of the coefficients LUT in Coefficient Table Local Memory 606 where the LUT will be stored, and a number indicating the LUT size.

Coefficient Table Local Memory 606 is duplicated for each processing elements, and each copy stores LUTs for more than one approximated function (the starting address of the LUT for each function is pointed at by a field in Coefficient Table Descriptor Memory 604). The number of LUTs that Coefficient Table Local Memory 606 stores is herein designated "L".

Inverse Hash Table 608 comprises L entries, wherein each entry is associated with a LUT in Coefficient Table Local Memory 606 and stores the corresponding function number. Hash Table 610 comprises M entries (that is—one entry for each approximated function that the vector processor supports). Each entry gets a first binary value (e.g. logic 1) if the LUT of the corresponding approximated function is currently stored in Coefficient Table Local Memory 606, and a second binary value otherwise. In embodiments of the present invention, Coefficient Table Descriptor Memory 604, Inverse-Hash Table 610 and Hash Table 608 are updated when the contents of the Coefficient Table Local Memory changes, and are used to quickly assess if an approximated function is stored in the Coefficient Table Local Memory, and in what starting address.

As would be appreciated, configurations 500 and 600 of FIG. 5 and FIG. 6 are examples that are depicted purely for the sake of conceptual clarity. Other suitable configurations may be used in alternative embodiments. For example, some fields of Coefficient Table Descriptor Memory 604 may be moved to Inverse Hash Table 608; for another example, Hash table 610 may be omitted.

Figure 7:
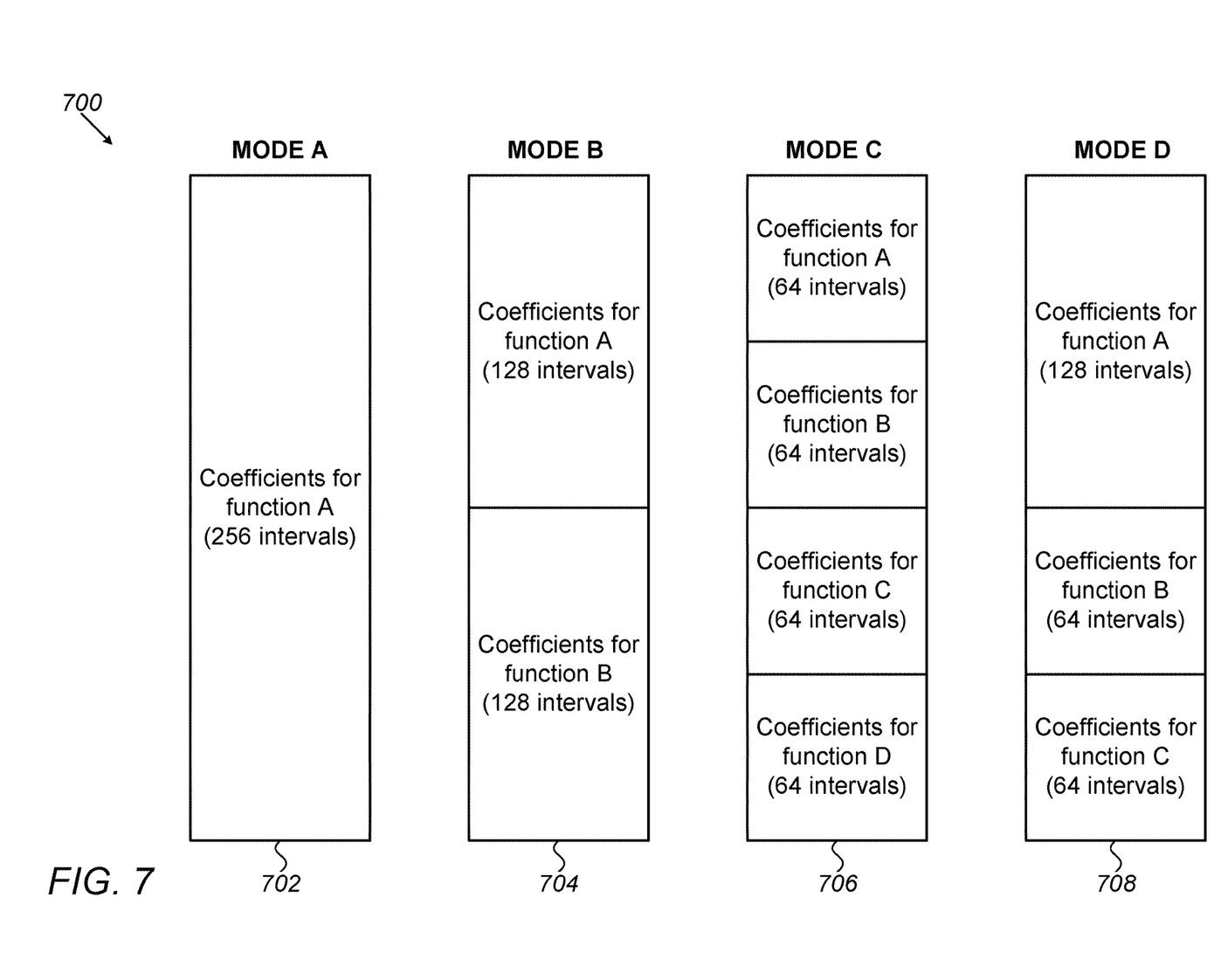
FIG. 7 is a block diagram that schematically illustrates the storage of coefficients in local coefficient memory, in four modes of operation, in accordance with an embodiment of the present invention.

FIG. 7 is a block diagram 700 that schematically describes storage of coefficients in local coefficient memory, in four modes of operation, in accordance with an embodiment of the present invention. In Mode A, a memory 702 stores a LUT for a single 256-interval approximated function. The vector processor stores coefficients for interval i at address i (or, if the width of The Coefficient Table Local Memory is w and w>1, i*w).

In Mode B, a memory 704 stores the coefficients for two 128-interval approximated functions: coefficients for function A in the first half of the memory, and coefficients for function B in the second half. Accessing coefficients for function A is done directly according to the interval number, whereas to access coefficient of function B the vector processor adds 128 to the interval number.

Similarly, In Mode C, a memory 706 stores the coefficients for four 64-interval approximated functions A, B, C and D; in the first, second, third and fourth quarters of the memory, respectively. To access coefficients, the vector processor adds to the interval number 0, 64, 128 or 192 for functions A, B, C and D, respectively.

Lastly, in Mode D, a memory 708 stores the coefficients for a 128-interval function A in the first half (addresses 0-127), the coefficients of a 64-interval function B from 128 to 191, and the coefficients of a 64-interval function C from 192 to 255. To access coefficients, the vector processor adds to the interval number 0, 128 or 192 for functions A, B and C, respectively.

As would be appreciated, configurations 702, 704, 706 and 708 of Coefficient Table Local Memory 116, are example configurations that are depicted purely for the sake of conceptual clarity. Other suitable configurations may be used in alternative embodiments of the present invention, including, for example, more modes of operation can be defined, RAMS which can store a larger number of coefficients, and storage wherein the coefficients of several functions are interleaved.

Figure 8:
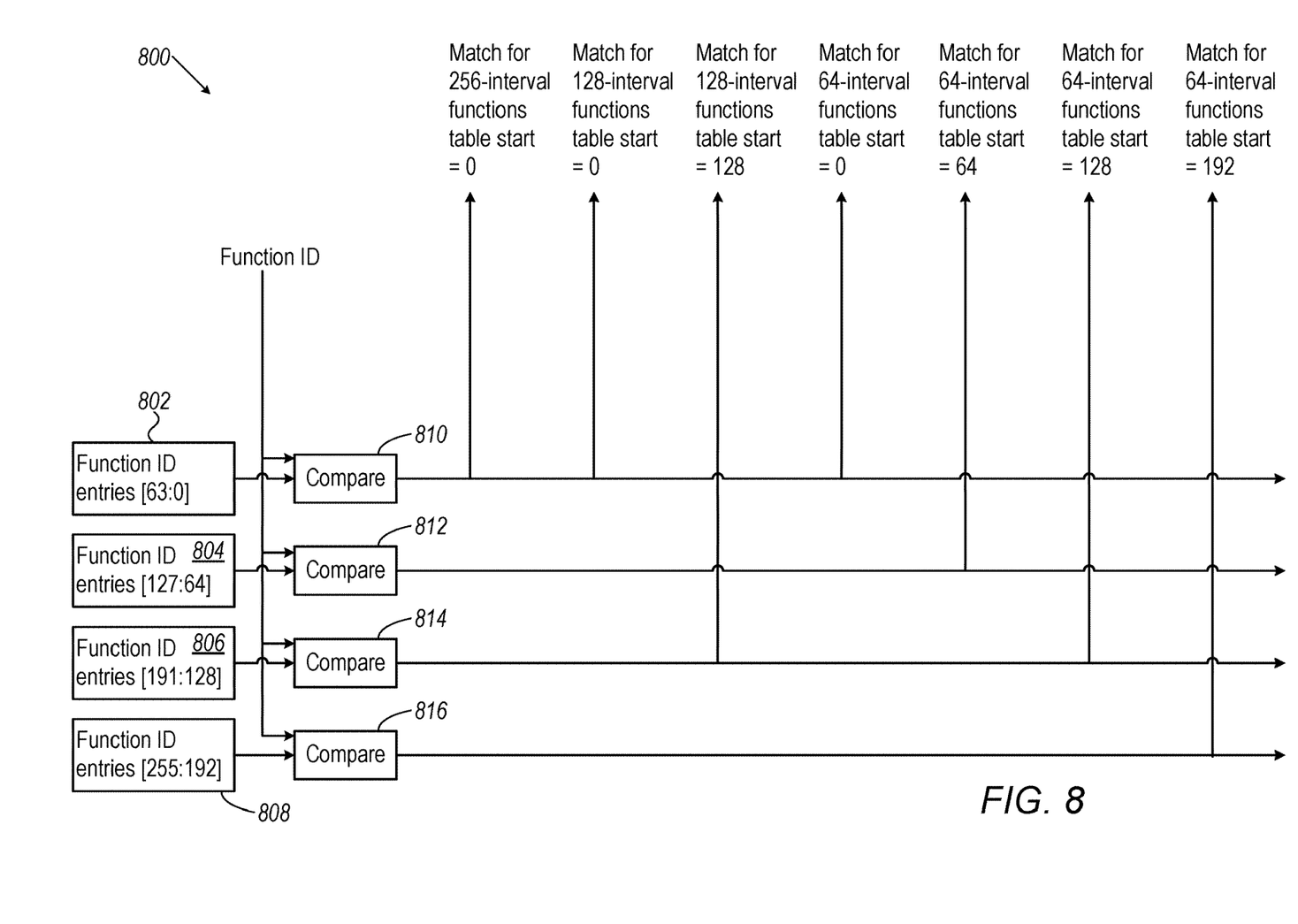
FIG. 8 is a block diagram that schematically illustrates the structure of local memory tag logic, in accordance with an alternative embodiment of the present invention.

FIG. 8 is a block diagram that schematically describes the structure of local memory tag logic 800, in accordance with an alternative embodiment of the present invention. The tag logic comprises a first ID register 802, a second ID register 804, a third ID register 806, a fourth ID register 808, and four comparators 810. ID registers 802, 804, 806 and 808, store four ID numbers of four approximated functions; the LUTs of the four functions are stored in Coefficient Table Local Memory 116, location 0-63, 64-127, 128-191 and 192-255, respectively.

Comparators 810, 812, 814 and 816 are configured to compare the function ID (input from Instruction Queue 104 of FIG. 1) to the function numbers that are stored in ID registers 802, 804, 806 and 808, respectively. The outputs of the comparators indicate if the LUT corresponding to the current function is stored in the Coefficient Table Local Memory, and the start address of the LUT: for a 256-interval function, a match detected by comparator 810 indicates that the function is stored in the local memory, from address=0. For 128-interval function, a match detected by comparator 810 indicates that the function is stored in the local memory, from address=0; a match detected by comparator 814 indicates that the function is stored in the local memory, from address=128; and no match in either comparator 810 or comparator 814 indicates that the function is not stored in the local memory.

For 64-interval function, a match detected by comparator 810 indicates that the function is stored in the local memory, from address=0; a match detected by comparator 812 indicates that the function is stored in the local memory, from address=64; a match detected by comparator 814 indicates that the function is stored in the local memory, from address=128; a match detected by comparator 816 indicates that the function is stored in the local memory, from address=192; and no match in either one of the four comparators indicates that the function is not stored in the local memory.

Thus, according to the example embodiment of FIG. 8, simple logic can detect if the LUT of a function is stored in Coefficient Table Local Memory 116, and what is the starting address of the LUT therein.

As would be appreciated, the configuration of local memory tag logic 800 presented in FIG. 8 is an example configuration that is depicted purely for the sake of conceptual clarity. Other suitable configurations may be used in alternative embodiments.

Support of Special Numbers

Some mathematical functions have a limited allowed input range and may output wrong values if the input extends from the allowed range. For example, reciprocal function cannot be executed if the input value is zero. In general, the output of a mathematical function may be one of the following nine number types (defined, for example, in IEEE 754 Floating Point standard): −inf (negative infinity), −normal (negative normalized number), −denorm (negative number, not normalized), −0 (negative 0), +0 (positive 0), +denorm (positive number, not normalized), normal (positive normalized number), +Inf (positive infinity), SNaN (signaling-Not-a-Number) and QNaN (Quiet Not-a-Number).

In embodiments according to the present invention, two additional ISA instructions are defined:
1. DST=FCLASS(SRC)—this instruction takes an input (typically a floating-point number) and classifies it to one of the ten number types defined above. The result is stored in a register in vector register file 110 (10 bits, one of which is set, and the others cleared).
2. DST—CALC_SPECIAL(SRC, function_type)—when a function is calculated using polynomial approximation, the some input values may not calculate correctly, and, hence, should be corrected. For example Reciprocal function with +Inf at the input should output +0, reciprocal function with +0 at the input should output +Inf. As another example, square-root function with −norm at the input should output NaN. The CALC_SPECIAL instruction will override the result of the polynomial approximation in those cases, to the appropriate type, according to the input number type and the approximated function.

According to an embodiment, the approximated instructions which may change the number type are the following (some of the instructions below are implemented by a string of other instructions):

| Function type | Description |
|---|---|
| RECIP | reciprocal - 1/x |
| RSQRT | reciprocal square root of x |
| SQRT | square root of x |
| LOG | logarithm of x |
| EXP | exponent ($e^x$, $2^x$, etc.) |
| TANH | hyperbolic tangent of x |
| DIV | divide - x/y |
| POW | power - $x^y$ |

The two instruction FCLASS and CAL SPECIAL typically follow each arithmetic function approximation.

As would be appreciated, the two ISA instructions FCLASS and CALC_SPECIAL presented hereinabove are example embodiments, which are described purely for the sake of conceptual clarity. Other suitable ISA instructions and methods for handling number types may be used in alternative embodiments. For example, the CALC_SPECIAL instruction may be omitted, if special logic is added in the vector processing element to update number representation in case non-numbers are generated, according to the function type. The configurations of Vector Processor 100, Vector Engine 106, Vector Processor Slice 200, and ALU 300 depicted in FIGS. 1, 2 and 3; the structure and contents of the memories depicted in FIGS. 5, 6 and 7; Flow Chart 400 depicted in FIG. 4; and Tag Logic 800 depicted in FIG. 8, are examples that are shown purely for the sake of conceptual clarity. Any other suitable configurations can be used in alternative embodiments. The different elements of Vector Processor 106 may be implemented using suitable hardware, such as in one or more Application-Specific Integrated Circuits (ASICs) or Field-Programmable Gate Arrays (FPGAs), using software, using hardware, or using a combination of hardware and software elements.

Although the embodiments described herein mainly address approximation of mathematical functions in a vector processor, the methods and systems described herein can also be used in various other applications; for example, computer graphics.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A vector processor, comprising:
a coefficient memory; and
a processor having an Instruction Set Architecture (ISA), which comprises an instruction that approximates a mathematical function by a polynomial, wherein the processor is configured to approximate the mathematical function over an argument, by identifying a range in which the argument falls and an interval start value of the range, reading one or more coefficients of the polynomial corresponding to the identified range from the coefficient memory and evaluating the polynomial at the argument using the read one or more coefficients and the interval start,
wherein the ISA includes a first instruction which receives the argument and returns the range in which the argument falls and an interval start value of the range in a single clock cycle of the processor, and one or more second instructions, which each is performed in a single clock cycle, wherein the one or more second instructions together load the one or more coefficients from the coefficient memory and evaluate the polynomial,
wherein the processor is configured to read one or more of the one or more coefficients from the coefficient memory, in parallel to calculating a difference between the argument and the interval start value of the range in which the argument falls.

2. The vector processor according to claim 1, wherein the ISA of the processor further comprises an instruction that classifies arguments of the mathematical functions to normalized numbers and at least to one type of non-normalized numbers.

3. The vector processor according to claim 1, wherein the ISA of the processor further comprises an instruction that changes the output of the mathematical function based on the number type of an input of the mathematical function.

4. The vector processor according to claim 1, wherein the processor is configured to approximate a plurality of different function types, and wherein the coefficient memory stores for each of the function types a coefficient table which includes an entry of the one or more coefficients for each of a plurality of ranges.

5. The vector processor according to claim 4, wherein the plurality of mathematical function types comprise at least a hyperbolic tangent function and a cosine function.

6. The vector processor according to claim 5, wherein the plurality of mathematical function types additionally comprise at least a log function and a square root function.

7. The vector processor according to claim 1, wherein the processor is configured to complete a calculation of the polynomial for a first argument in a pipeline concurrently with identifying a range in which a second argument in the pipeline falls.

8. The vector processor according to claim 1, wherein the processor is configured to evaluate the polynomial at the argument by setting a function intermediate value to a first of the one or more coefficients, and iteratively performing:
   multiplying the function intermediate value by a difference between the argument and an interval start of the range in which the argument falls; and
   adding a next coefficient of the one or more coefficients to the multiplication result.

9. The vector processor according to claim 8, wherein in evaluating the polynomial at the argument the processor is configured to read a value indicating an order of the polynomial and to perform a number of iterations responsive to the order of the polynomial.

10. The vector processor according to claim 1, wherein the ISA of the processor further comprises an instruction that classifies arguments as being positive or negative, and infinite, zero or neither.

11. The vector processor according to claim 10, wherein the ISA of the processor further comprises an instruction that receives an indication of a function and an argument and returns a result of the function not based on evaluation of the polynomial, if a classification of the argument is known to not evaluate correctly for the function.

12. A vector processor, comprising:
   a coefficient memory; and
   a processor having an Instruction Set Architecture (ISA), which comprises an instruction that approximates a mathematical function by a polynomial, wherein the processor is configured to approximate the mathematical function over an argument, by identifying a range in which the argument falls and an interval start value of the range, reading one or more coefficients of the polynomial corresponding to the identified range from the coefficient memory and evaluating the polynomial at the argument using the read one or more coefficients and the interval start,
   wherein the ISA includes a first instruction which receives the argument and returns the range in which the argument falls and an interval start value of the range in a single clock cycle of the processor, and one or more second instructions, which each is performed in a single clock cycle, wherein the one or more second instructions together load the one or more coefficients from the coefficient memory and evaluate the polynomial,
   wherein the coefficient memory comprises a global coefficient memory configured to store the coefficients of a plurality of polynomials that approximate a plurality of mathematical functions, and a local coefficient memory configured to store tables of the coefficients of a subset of the mathematical functions, and
   wherein the processor is configured to read the coefficients for a given mathematical function from the local coefficient memory, and, if the table of coefficients of a given mathematical function is not in the subset, to read the table of coefficients for the given mathematical function from the global coefficient memory into the local coefficient memory.

13. The vector processor according to claim 12, further comprising:
   a coefficient descriptor memory, configured to store at least a first pointer pointing to the coefficients of the polynomials of the given mathematical function in the global coefficient memory and, if the given mathematical function belongs to the subset, a second pointer pointing to the coefficients of the polynomials of the given mathematical function in the local coefficients memory;
   a hash table, configured to store, for each mathematical function, a symbol indicating whether the mathematical function belongs to the subset; and
   an inverse hash table, configured to store, for each of the mathematical functions in the subset, an identifier of the mathematical function.

14. The vector processor according to claim 12, further comprising tag registers configured to store identifiers of the mathematical functions that are approximated by the coefficients stored in the local coefficient memory, wherein, the processor is configured to load the coefficients of the mathematical function from the local coefficient memory, at a starting address that corresponds to a tag register that stores an identifier corresponding to an identifier of the mathematical function, or from the global coefficient memory if none of the tag registers stores an identifier of the mathematical function.

15. The vector processor according to claim 12, wherein the processor is configured to read one or more of the one or more coefficients from the coefficient memory, in parallel to calculating a difference between the argument and the interval start value of the range in which the argument falls.

16. The vector processor according to claim 12, wherein the processor comprises a vector engine and a scalar engine, which fetches Single Instruction Multiple Data (SIMD) instructions from an instruction memory and sends a vector processing part of the instructions to the vector engine.

17. The vector processor according to claim 16, wherein the processor checks whether the corresponding table of the indicated function is in the local coefficient memory when an instruction is being parsed.

18. The vector processor according to claim 12, wherein the processor is configured to pause an execution pipe of the processor until the table of the indicated function is copied from the global memory to the local coefficient memory.

19. The vector processor according to claim 12, wherein the local coefficient memory is configured to hold at any single time, a table of only a single function.

20. The vector processor according to claim 12, wherein the local coefficient memory is configured to hold concurrently, corresponding tables of a plurality of functions.

21. The vector processor according to claim 20, wherein the first instruction additionally receives an indication of a function_type and calculates the range in which the argument falls and the interval start value differently for different function types.

22. The vector processor according to claim 20, wherein the table of at least one of the functions comprises multiple sub-tables, and wherein the first instruction identifies the range in which the received argument falls, by determining both a sub-table value and an interval value within the sub-table.

23. A method, comprising:

in a processor having an Instruction Set Architecture (ISA), which comprises an instruction that approximates a mathematical function by a polynomial, storing one or more coefficients of the polynomial in a coefficient memory;

executing in a single clock cycle of the processor, a first instruction, which receives an argument and returns the range in which the argument falls and an interval start value of the range; and approximating the mathematical function over an argument, by reading the one or more coefficients of the polynomial from the coefficient memory and evaluating the polynomial at the argument using the coefficients, in response to one or more second instructions, which each is performed in a single clock cycle, wherein storing the coefficients comprises storing in a global coefficient memory the coefficients of a plurality of polynomials that approximate a plurality of mathematical functions, and storing in a local coefficient memory the coefficients of a subset of the polynomials, corresponding to a subset of the mathematical functions, and wherein approximating the mathematical function comprises reading the coefficients for a given mathematical function from the local coefficient memory if the given mathematical function belongs to the subset, and, if the given mathematical function is not in the subset, reading the coefficients for the given mathematical function from the global coefficient memory, wherein storing the coefficients further comprises:

storing, in a coefficient descriptor memory, at least a first pointer pointing to the coefficients of the polynomials of the given mathematical function in the global coefficient memory and, if the given mathematical function belongs to the subset, a second pointer pointing to the coefficients of the polynomials of the given mathematical function in the local coefficients memory;

storing in a hash table, for each mathematical function, a symbol indicating whether the mathematical function belongs to the subset; and storing in an inverse hash table, for each of the mathematical functions in the subset, an identifier of the mathematical function.

24. The method according to claim 23, further comprising executing an instruction in the ISA of the processor that classifies arguments of the mathematical functions to normalized numbers and at least to one type of non-normalized numbers.

25. The method according to claim 23, further comprising executing an instruction in the ISA of the processor that changes the output of the mathematical function based on the number type of an input of the mathematical function.

26. A method, comprising:

in a processor having an Instruction Set Architecture (ISA), which comprises an instruction that approximates a mathematical function by a polynomial, storing one or more coefficients of the polynomial in a coefficient memory;

executing in a single clock cycle of the processor, a first instruction, which receives an argument and returns the range in which the argument falls and an interval start value of the range; and approximating the mathematical function over an argument, by reading the one or more coefficients of the polynomial from the coefficient memory and evaluating the polynomial at the argument using the coefficients, in response to one or more second instructions, which each is performed in a single clock cycle, wherein storing the coefficients comprises storing in a global coefficient memory the coefficients of a plurality of polynomials that approximate a plurality of mathematical functions, and storing in a local coefficient memory the coefficients of a subset of the polynomials, corresponding to a subset of the mathematical functions, and wherein approximating the mathematical function comprises reading the coefficients for a given mathematical function from the local coefficient memory if the given mathematical function belongs to the subset, and, if the given mathematical function is not in the subset, reading the coefficients for the given mathematical function from the global coefficient memory, wherein storing the coefficients further comprises storing in tag registers identifiers of the mathematical functions that are approximated by the coefficients stored in the local coefficient memory, and wherein approximating the mathematical function comprises loading the coefficients of the mathematical function from the local coefficient memory, at a starting address that corresponds to a tag register that stores an identifier corresponding to an identifier of the mathematical function, or from the global coefficient memory if none of the tag registers stores an identifier of the mathematical function.

* * * * *